(12) United States Patent
Timm et al.

(10) Patent No.: US 9,124,450 B2
(45) Date of Patent: Sep. 1, 2015

(54) VRRP AND LEARNING BRIDGE CPE

(71) Applicant: TELEFONAKTIEBOLAGET L M ERICSSON (PUBL), Stockholm (SE)

(72) Inventors: Lars Timm, Struer (DK); Torben Melsen, Holstebro (DK)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 227 days.

(21) Appl. No.: 13/864,364

(22) Filed: Apr. 17, 2013

(65) Prior Publication Data

US 2013/0195115 A1 Aug. 1, 2013

Related U.S. Application Data

(62) Division of application No. 12/681,422, filed as application No. PCT/SE2007/000877 on Oct. 2, 2007, now Pat. No. 8,477,782.

(51) Int. Cl.
| | |
|---|---|
| H04L 12/28 | (2006.01) |
| H04L 12/66 | (2006.01) |
| H04L 29/12 | (2006.01) |
| H04L 12/701 | (2013.01) |
| H04L 12/713 | (2013.01) |

(52) U.S. Cl.
CPC .......... *H04L 12/66* (2013.01); *H04L 29/12028* (2013.01); *H04L 45/00* (2013.01); *H04L 45/586* (2013.01); *H04L 61/103* (2013.01)

(58) Field of Classification Search
CPC . H04L 29/12028; H04L 45/00; H04L 45/586; H04L 61/103
USPC .................................. 370/252, 389, 392, 401
See application file for complete search history.

(56) References Cited

U.S. PATENT DOCUMENTS

| | | | |
|---|---|---|---|
| 2004/0213272 A1* | 10/2004 | Nishi et al. .................... | 370/401 |
| 2007/0165648 A1 | 7/2007 | Joo | |
| 2008/0151882 A1 | 6/2008 | Sanjay et al. | |
| 2008/0186968 A1* | 8/2008 | Farinacci et al. ............. | 370/392 |

OTHER PUBLICATIONS

Melsen, et al. MAC-Forced Forwarding: A Method for Subscriber Separation on an Ethernet Access Network. IETF RFC 4562; Jun. 2006.
Nadas, S. Virtual Router Redundancy Protocol Version 3 for IPv4 and IPv6. IETF Internet-Draft; Nov. 16, 2007.

* cited by examiner

*Primary Examiner* — Kan Yuen

(57) ABSTRACT

The present invention describes an access node for communication in a telecommunication network comprising: an input/output unit adapted for receiving a first information message, wherein the first information message comprises a logical address associated with a virtual network node, a processing unit for extracting the logical address of the virtual network node and for determining a hardware address associated with the logical address of the virtual network node, where the processing unit is further adapted for a determining a logical address of an end-user host communicating with the virtual network node, wherein the access node is configured to transmit a second information message comprising the logical and hardware address of the virtual network node to the logical address of the end-user host. Also, a network infrastructure where the access node is operating is described. The access node also implements a method of the present invention by means of a computer program comprising instruction sets for implementing the method steps of the invention.

16 Claims, 2 Drawing Sheets

VRRP AND LEARNING BRIDGE CPE

RELATED APPLICATIONS

This application is a divisional of co-pending U.S. Pat. application No. 12/681,422 filed Apr. 2, 2010, which is a 371 of International Application No. PCT/SE2007/00877, filed Oct. 2, 2007, the disclosures of which are fully incorporated herein by reference.

TECHNICAL FIELD

The present invention is related to hardware address resolution in telecommunication networks.

BACKGROUND

Usually, in today's telecommunication networks, of which Internet is the most popular, data packets sent from a network entity to another have a source and a destination IP-address, which in version four of the IP-protocol is 4 bytes long, However, hardware network interfaces in these network entities do not understand the IP-address format, since they operate only with hardware addresses. Thus, there is a necessity to find the hardware address of the network entity to which another network entity is sending one or more data packets.

Since the most frequently used type of hardware network interface is an Ethernet interface, these hardware addresses most often are MAC (Media Access Control Addresses) using a 6 byte address format. A MAC address is usually assigned to the device after it is manufactured.

Now, for example on the Internet, the way to obtain the MAC address of a hardware entity to which a packet is to be sent or forwarded can be obtained by sending a so called ARP (Address Resolution Protocol) packet. The ARP packet has the IP-address of the hardware entity of interest as the destination address and is asking for the MAC address of that same hardware entity. As an answer, an ARP-packet containing the MAC-address of the hardware entity is returned to the sender.

One other way sometimes used by Ethernet bridges is flooding. Thus, in case an, Ethernet bridge or some other network node capable of handling Ethernet frames receives a data packet, it will forward the Ethernet frame on all its ports except the incoming port. From all the entities in the network listening to the Ethernet frame, the one having the MAC destination address of the Ethernet frame as its hardware address will receive the Ethernet frame. All other network entities will discard the Ethernet frame.

In case a router receives a data packet with a destination IP-address where the MAC-address of the destination is unknown, it may transmit an ARP packet to that destination IP-address. The ARP-packet is transmitted on the router port associated with the subnet on which the destination IP-address is defined. Then, the entity having the IP-address in the ARP request as its destination address will answer with a data packet comprising its MAC address and the router may forward the data packet to that entity.

It may be mentioned that other types of Layer 2-protocols (the protocol layer below the IP-layer) beside the Ethernet protocol are known and used. Examples of such Layer 2-protocols are ATM (Asynchronous Transfer Mode), FDDI, Token ring and other types of network structures.

In an ATM network, for example, which is a sort of hybrid between a packet-switched and a circuit switched network, data packets are sent in the form of virtual cells, while a more or less permanent path is established for these virtual cells between a transmitter and a receiver. This path is called a VC (Virtual Circuit) in ATM terminology.

In such and similar networks, where a user may use one or more services offered by the network at the same time, these services are often delivered via multiple logical access channels. The advantage of using logical channels is a complete separation of the different services.

In this respect, the mapping of upstream end-user traffic to the appropriate logical channel may be based on different principles, such as the destination MAC address. In this case, the device (CPE—Customer Premises Equipment) performing the upstream mapping may be a learning Ethernet bridge. Upstream traffic towards a MAC address that is not known (learned) by the bridge is flooded on all logical channels.

Logical channels may for example be ATM PVCs (Permanent Virtual Circuits) used for ADSL access or IEEE802.1Q VLANs (Virtual Local Area Networks) used among others for VDSL (Very high-speed Digital Subscriber Line) or native Ethernet access.

RFC3768 specifies a protocol called VRRP (Virtual Router Redundancy Protocol). It is a protocol that allows two (or more) routers to operate in a redundancy scheme, where one router always acts as a master, while the other router or routers act as backup router, In case of failure of the master, one of the backup routers takes over and acts as a master. Thus outwardly, the two or more routers appear as one virtual router. In the remaining part of the description the term virtual router will refer to a group of two or more routers, where one of the routers is the owner of one or more virtual router IP-addresses. Thus all packet data traffic directed towards this virtual router address will be handled by the owner of the virtual router address. A VRRP-router is defined here as one individual router operating according to the VRRP protocol.

Now the routers in such a situation are configured with a common virtual router MAC address which is used as "Sender MAC Address" in the payload of ARP replies sent from the virtual router towards ARP-requesting hosts. RFC826 contains a detailed description of the Address Resolution Protocol.

However, routers use in general another and individual MAC address as Ethernet frame source address, both for the ARP-reply and for all other downstream traffic.

Thus, when an Ethernet frame is sent from one of the VRRP routers to a destination via, for example, an Ethernet bridge, the Ethernet frame will contain the individual MAC address of one of the VRRP routers in the header. However, an ARP response message sent to a terminal will contain the virtual router MAC address in the payload of the Ethernet frame.

This means that the learning bridge CPE will learn the individual VRRP router MAC addresses, but never the virtual router MAC address, However, the end-user host who issued an ARP request will use the virtual router MAC address as the destination address for upstream traffic, because it was told to via the ARP reply. The result is that the Ethernet bridge receiving the Ethernet frame having the virtual router MAC address as the destination address from the end-user host upstream will always flood the frame on all logical channels, which wastes bandwidth in the local loop and in the aggregation network, and also unnecessarily occupies MAC tables in aggregation network switches.

The object of the present invention is to offer a solution to at least some of the problems associated with known technology.

SUMMARY

An solution some of the problems of Known technology is related to an access node for communication in a telecommunication network comprising:

an input/output unit adapted receiving a first information message which the first comprises a logical address associated with a virtual network node;

a processing unit for extracting the logical address of the virtual network node and for determining a hardware address associated with the logical address of the virtual network node, where the processing is further adapted for a determining a logical address of an end-user host communicating with the virtual network node, wherein the access node is configured to transmit a second information message comprising the logical and hardware address of the virtual network node to the logical address of the end-user host.

The advantage of the access node according to the present invention is the reduction of unnecessary traffic between an Ethernet bridge and the aggregation network, since the Ethernet bridge will receive the second information message and store the hardware address of the virtual network node. Hence all Ethernet frames directed to the hardware address of the virtual node need not be flooded as was the case in known technology.

A second advantage of the access node according to the present invention is that it is functional irrespective of end-user security hardware, such as firewalls, NAT (Network Address Translator) and other security components.

A third advantage of the access node according to the present invention is that hardware address tables in the aggregation network (the network where the virtual node is located) are not polluted with irrelevant addresses, One other advantage of the access node according to the present invention is that the architecture of the aggregation network is not revealed to end-users, thus preventing malicious end-users from rerouting traffic from other end-users legitimately communication with the virtual node.

A second aspect of the present invention is related to a telecommunication network infrastructure comprising:

two or more network nodes configured to operate as one virtual network node which has a logical and a hardware virtual node address, wherein the one or more network nodes are configured to transmit a first information message comprising a logical address of the virtual network node;

an access node adapted for receiving the first information message and for determining a hardware address associated with the logical address of the virtual node;

a bridging node adapted for connecting one or more end-user hosts with each other and with the access node;

one or more end-user hosts comprising a logical address adapted for communication with the virtual network node via the bridging node and the virtual network node, wherein the access node is further configured to transmit a second information message comprising the logical and hardware address of the virtual network node, wherein the bridging node is adapted to forward the second information message to one or more end-user hosts and to store the logical and hardware address of the virtual router.

According to a third aspect of the present invention, a solution for the problems associated with known technology is proposed by a method for communication in a telecommunication network comprising the steps:

a) receiving a first information message comprising a logical address associated with a virtual network node, wherein the virtual network node comprises two or more network nodes in the telecommunication network;

b) extracting a logical address of the virtual node from the first information message;

c) determining a hardware address of the virtual network node associated with the logical address of the virtual network node;

d) determining a logical end-user host address associated with the extracted logical or hardware address and;

e) transmitting a second information message comprising the logical and hardware address of the virtual network node.

It should be mentioned here, that the access node according to the present invention is specially suited for implementing the method steps described previously.

Also, one other aspect of the present invention is related to a computer program for communication in a telecommunication network comprising instruction sets for:

receiving a first information message comprising a logical address associated with a virtual network node, wherein the virtual network node comprising two or more network nodes in the telecommunication network;

extracting a logical address of the virtual node from the first information message; determining a hardware address of the virtual network node associated with the logical address of the virtual network node;

determining a logical end-user host address associated with the extracted logical or hardware address and;

transmitting a second information message comprising the logical and hardware address of the virtual network node.

It should be mentioned here that the computer program according to the present invention is specially suited for implementing the method steps according to the method of the present invention and to be executed in the access node described earlier.

These and other advantages of the present invention will become more apparent by reading the detailed description below.

DETAILED DESCRIPTION

Figure 1:
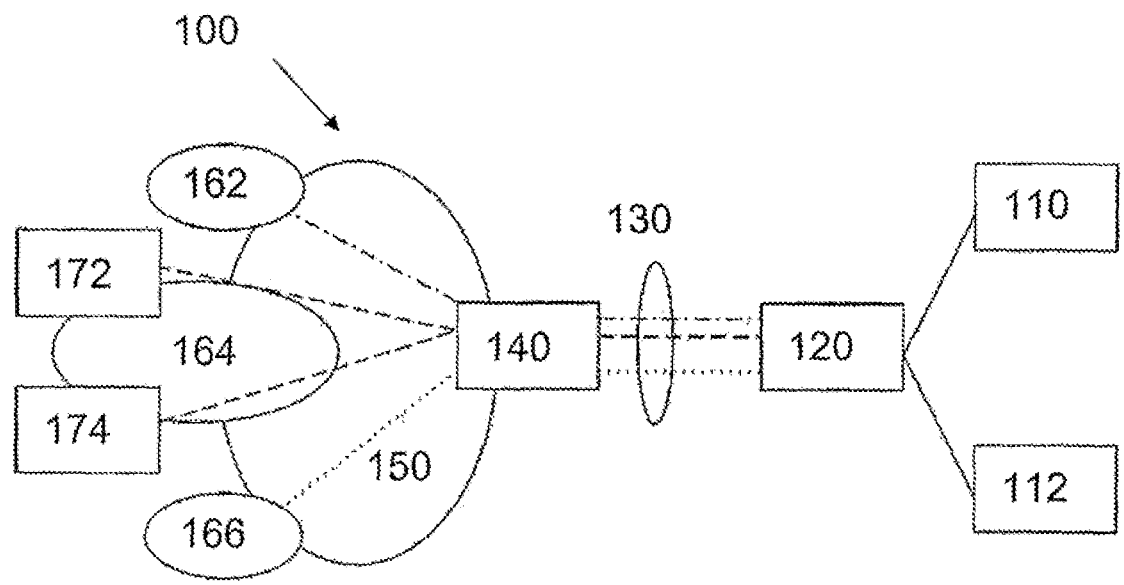
FIG. 1 illustrates an example network infrastructure according to the present invention.

FIG. 1 illustrates a network infrastructure 100 according to one embodiment of the present invention.

It may be mentioned here that the network infrastructure 100 in FIG. 1 may depict any type of telecommunication network in which data is sent in packets or on frames from an end-user host to a node in the network. Thus, the present invention may also be applied in wireless telecommunication networks are part of the present invention.

Now, the network infrastructure 100 in FIG. 1 comprises a first end-user host 110 and a second end-user host 112 connected to a learning bridge in the case of an Ethernet connection. However, instead of a learning bridge 120, the first and second end-user hosts 110, 112 may as well be connected to an Ethernet switch, a hub or some other Ethernet node performing a function equivalent to the learning bridge 120. It may be mentioned here that the end-user hosts 110 and 112 may comprise mobile terminals or static telecommunication terminals, as preferred.

Both end-user hosts 110 and 112 are using services provided by an aggregation network 150. In ATM and IEEE802.1Q these services may be accessed on logical channels 130. However, even though this part of the description is focusing on services accessed on logical channels, these services may equally be delivered on other types of channels as long as the services delivered on these channels are separated. One example of other types of channels are VPNs (Virtual Private Networks) where each user may access services from an aggregation network (which often is a business network of the company he is employed at) on a secure and encrypted channel.

Data on logical channels 130 is entering and leaving the aggregation network 150 through an access node 140. Depending on the type of telecommunication network the access node 140 may comprise a DSLAM (Digital Subscriber Line Access Multiplexer), a wireless access point, a base station transceiver or some other network node performing a role equivalent to an access node.

Through the access node 140, the first and second end-user hosts 110 and 112 are able to access different types of services in the aggregation network 150, such as services 162, 164 and 166, which, as an example, may represent, video, Voice-over-IP and use data traffic.

Now, in order to provide for a robust packet routing system which may withstand a failure of one or more routers in the aggregation network 150, the network infrastructure 100 in this example comprises a first router 172 and a second router 174 connected in a virtual router configuration and configured to function according to the VRRP Virtual Router Redundancy Protocol). One of them may be chosen to act as a master router, such as, for example, the first router 172, while the other, i.e. the second router 174 may be configured to perform the function of a backup router. Thus, in case the first router 172 should experience a partial or complete failure, the second router 174 may take over as the new master router.

However, the first and the second routers 172, 174 may act as backup routers for each other. In this fashion, one router will always be available to take over if the other fails.

It should be added that the VRRP configuration may comprise any desired number of routers configured to act as the new master router as the current master router fails. Since the VRRP is known to the skilled person, the protocol will not be elaborated further here.

Now, normally the learning Ethernet bridge 120 is not able to detect the virtual router MAC address for data that is transmitted from one of the end-user hosts 110, 112 towards one of the routers 172, 174.

However, the network entity that usually has this information stored in its ARP cache is the access node 140. In many cases the virtual router MAC address is stored in the ARP cache of the access node 140 by receiving VRRP announcement messages from one of the VRRP routers 172, 174 and transmitting an ARP packet to the virtual router IP address from which the VRRP announcement originated. As a reply, the access node 140 will then receive the virtual router MAC address. Usually, network operators try to hide as much of the internal structure of the aggregation network 140 as possible from end-users in order to prevent malicious users from sending ARP packets to other entities in the network infrastructure 100 and thereby disturb and possible hijack network traffic from other users. One other risk with broadcasting VRRP announcement messages across the network infrastructure 100 is the possibility of the VRRP authentication scheme being hacked, therefore allowing malicious users to reroute user traffic.

Thus, network operators would desire to prevent any such VRRP announcement messages to exit the aggregation network 150.

According to this example network infrastructure 100 of the present invention, the access node 140 is adapted for sending gratuitous ARP packets to end-user hosts 110, 112.

However, in contrast to usual gratuitous ARP packets which normally comprise the IP-address and the MAC-address of the sender, the gratuitous ARP packet transmitted in this example of the network infrastructure 100 according to the present invention comprises the IP- and the MAC address of the virtual router. These addresses the access node 140 may retrieve from a table in its memory (not shown). Initially, the access node may be configured to populate the table with IP- and MAC-address values of the virtual router by DHCP (Dynamic Host Control Protocol)-snooping of traffic between end-user hosts and the virtual router and thereafter by transmitting an ARP-packet to the one or more virtual router IP-addresses.

In this fashion, the learning bridge 120 may update its MAC address table with the VRRP router MAC address from the gratuitous ARP packet received. Thus data packets transmitted by the end-user hosts 110, 112 having the IP-address and MAC-address of the VRRP router as destination address will be directly forwarded by the learning bridge 140 to the right destination.

Additionally, the access node 140 may send gratuitous ARP packets on the one or more logical channels via which they are accessing service provided by the aggregation network 150. Thereby the learning bridge 120 will learn the correct MAC address on the right logical channel 130.

Now, the access node 140 may be adapted to send the gratuitous ARP packets when triggered by several different events, such as VRRP announcements coming from the one or more routers 172, 174 operating as a virtual router.

Depending on the frequency of VRRP announcements in the aggregation network 150, the access node 140 may choose to transmit the gratuitous ARP packets after having received N times VRRP announcements, where N may, for example, be chosen to be a number between 1 and 255. In this fashion traffic caused by frequent transmission of gratuitous ARP packets on the end-user logical channels 130. This may be desirable in aggregation networks where VRRP announcements are sent out very often, such as every second.

Additionally, the access node 140 may be adapted to send gratuitous ARP packets which are triggered by a timer, i.e. to send ARP packets after a certain amount of time. The time may be short, i.e. a couple of seconds, or long, such as 30 seconds or longer.

These trigger events may be chosen freely and stored in a configuration parameter in the access node 140.

Figure 2:
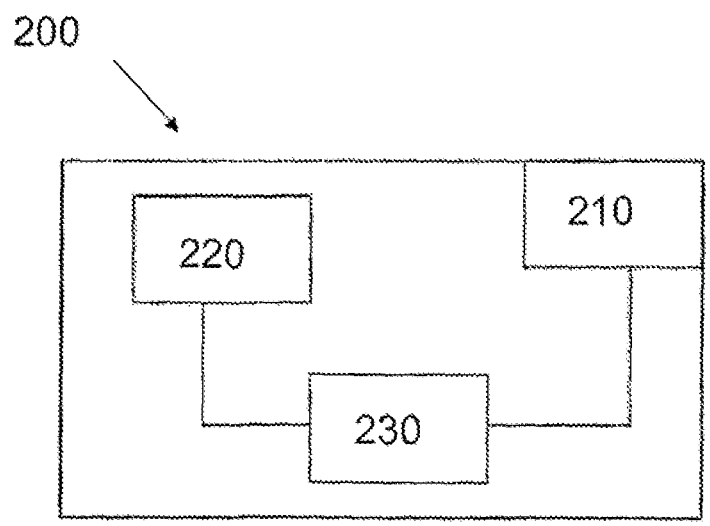
FIG. 2 illustrates an access node according to one embodiment of the present invention

Turning now to FIG. 2, an access node 200 is illustrated having an input/output unit 210, a memory 220 and a processing unit 230. Many network nodes may assume the function of an access node, such as a switch or hub, but also a wireless access point allowing access to a LAN or the Internet, for example.

By means of the input/output unit 210 the access node 200 is able to transmit and receive control data and data packets to and from other nodes in the network which it provides access to. The control data and the data packets may be forwarded to input or output ports towards or from the network the access node 200 is providing access to.

Examples of data packets forwarded may be common IP-packets, TCP (Transmission Control Protocol) and UDP (User Datagram Protocol)-packets, ARP-packets or other types of data packets.

Now, the access node 200 also comprises a memory 220 for caching IP- and MAC-addresses in order to be able to forward data packets through the right input or output port without being forced to transmit the data packet on all its output ports. By default, the access node 200 is configured to discard all data packets having an unknown MAC address for security reasons. It may be for example possible for a malicious user to flood the access node with data packets with an unknown destination MAC address and thereby slow down the traffic from the aggregation network 150 to the end-user hosts.

Communicating with both the input/output unit 210 and the memory 220 is the processing unit 230, which, among other things, is adapted to examine the header of the data packets entering or leaving the access node. If the access node 200 is constructed as an Ethernet-bridge, the destination address in the header of the data frame will be a destination MAC address for the Ethernet frame. Now, the processing unit 230 is adapted to compare the destination MAC-address with a list or table of MAC-addresses stored in its memory 220. If a match is found, the Ethernet frame will be forwarded to the right port or logical channel associated with the destination MAC address If not, the access node 200 may discard the Ethernet frame for the reasons mentioned earlier.

Via the input/output unit 210, the access node 200 is also adapted to receive so called VRRP announcements, i.e. information messages comprising virtual router IP-addresses. Usually, these information messages are, as already mentioned earlier, sent out regularly, such as, for example every second by the one or more VRRP-routers.

The processing unit 230 may be adapted to update a certain trigger parameter P each time such a VRRP announcement is received from one or more VRRP routers. When the P reaches a predefined count, a gratuitous ARP is transmitted towards end-users accessing a communication network via the access node 200. Selecting the predefined count according to need will then lead to more or fess frequent transmission of the gratuitous ARP messages. The special characteristic of these gratuitous ARP-messages is that the source IP- and MAC address transmitted in the message are the virtual router IP- and MAC-addresses, which is different from the standard ARP message containing the IP- and MAC-address of the sender.

Also, the processing unit 230 of the access node 200 may be adapted to retrieve the IP address of the gateway associated with a logical channel an end-user host is using.

In this case, the gateway IP-address corresponds to the virtual router IP-address acting as the owner of this IP-address. If there are, for example, two VRRP routers acting as a virtual router, one of them may be the owner of one gateway IP-address, while the other VRRP router may be configured to be the owner of another gateway IP-address.

Figure 3:
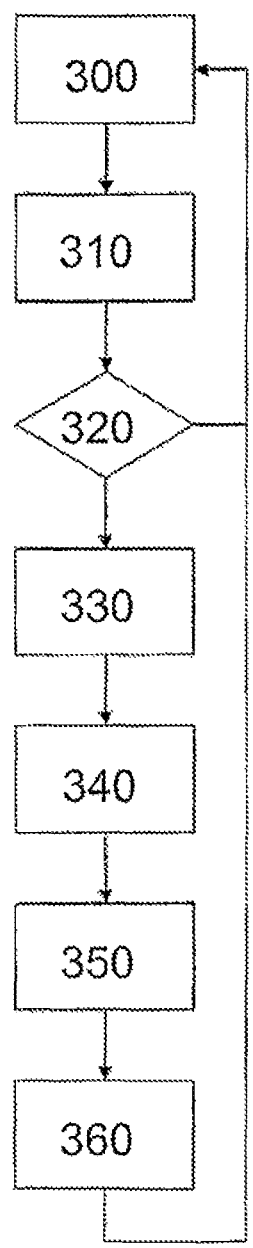
FIG. 3 shows the method steps performed in an embodiment of a method according to the present invention.

Referring now to FIG. 3, an example method according to the present invention is presented below.

At step 300, the access node, such as the access node 140, 200 described in FIGS. 1 and 2 receives a so called VRRP (Virtual Router Redundancy Protocol) announcement from the network where one or more routers configured as a virtual router are operating.

This VRRP announcement is an information message comprising among others the source IP-address of the virtual router and the virtual router ID. However, in a VRRP configuration with, say, two routers, where each router is acting as a backup for the other router, one VRRP announcement may be transmitted by the first router and at another time the VRRP announcement may be transmitted by the second router. Thus, at times, the VRRP announcement may contain the virtual router IP-address of the first and at times the virtual router IP-address of the second router.

Thereafter, at step 310, the access node increments a trigger parameter P indicative of the number of VRRP announcements received by one and stores the parameter value in the memory, such as the memory 220. Here, each gateway may have its own trigger parameter P Thus, in the case of multiple gateways, the trigger parameter P is incremented separately for each gateway. It should be mentioned here that the trigger parameter P may also be configured to have a certain initial value N and to be decremented by one each time the access node receives a VRRP announcement message.

One other possibility is to configure the trigger parameter P as a timer value, which is incremented regardless of how many VRRP announcements have been received.

Thereafter, the processing unit of the access node, such as the processing unit 230 checks at step 320 whether the trigger parameter P has reached a predefined value N. This predefined value may be freely chosen and its impact will be explained below.

If at step 320, the processing unit has determined that the trigger parameter P has not reached the predefined value, the access node returns to step 300 where it continues to receive VRRP announcements from the virtual router.

If, however, the processing unit of the access node has determined that P is equal to the predefined value N, it determines at step 330 the virtual IP-address of the one or more routers from the VRRP message and the logical channels associated with that virtual router IP-address. This the access node may do by DHCP snooping, i.e. by retrieving DHCP configuration messages in which one or more end-user hosts are allocated an IP-address by a DHCP-server and the gateway IP-address which the end-user host will be using when accessing a service provided by the network in which the VRRP routers are located. Using DHCP-snooping the processing unit of the access node may populate a table stored in the memory of the access node, where each end-user hosts IP-address is associated with a gateway IP-address, i.e. the destination IP-address handled by one of the at least two virtual routers.

In this fashion, the access node is able to associate the right end-user host with the right virtual router or gateway IP-address.

Next, at step 340, the processing unit generates an ARP packet and transmits it via the input/output-unit of the access node, such as the input/output unit 210, to the virtual router IP-address where the VRRP announcement originated.

As a response to the transmitted ARP-packet, the access node receives at step 350 an ARP-reply packet with the MAC-address of the virtual router from which the VRRP announcement originated. However, the access node may already have stored the virtual router MAC address in MAC address table from a previous ARP response. One other possibility may be that the virtual router MAC address is already configured in the access node by a technician. One other possibility of extracting the virtual router MAC address is to snoop it directly from the VRRP announcement message. In these cases the generation of an ARP packet at step 340 may not be needed.

Finally, the processing unit of the access node transmits a gratuitous ARP-packet comprising the virtual router IP- and MAC-address over the logical channel associated with the gateway IP to the end-user host, step 360. In this fashion, an Ethernet bridge connecting end-user hosts with the access nodes will receive the gratuitous ARP-packet and update its MAC address table with the gateway MAC-address of the virtual router. In this fashion, next time an end-user hosts is transmitting data to the virtual router MAC address, it will be able to forward the data packet or data frame to the right port without being forced to flood the data on all its ports.

Even though the example method above focuses on a wired telecommunication network, it may equally be performed in any wireless communication network which comprises nodes operating as a virtual node, an access node, a connecting node and one or more end-user hosts. Ultimately the scope of the present invention is only limited by the accompanying patent claims.

It may also be mentioned, that the steps of the example method according to the present invention as described In the text above and illustrated in FIG. 3 may be implemented by a computer program comprising Instruction sets for each of the steps in FIG. 3. This computer program may be stored in a memory of the access node 200, such as the memory 220 or be part of the processing unit 230 of the access node 200 in the form of an ASIC (Application Specific Integrated Circuit). It may also be available on an external memory (not shown) which may be pluggable into the access node 200.

The main advantages of the invention are the reduction of traffic overhead due to flooding of data packets or data frames by the Ethernet learning bridge. Another advantage is that MAC tables in The aggregation network are not polluted with irrelevant MAC-addresses. One other advantage is that transmission of gratuitous ARP-packets to end-user hosts will hide the network infrastructure of the aggregation network from an end-user, thus preventing malicious end-users from breaking the VRRP authentication scheme and redirecting data traffic towards themselves. One other advantage of the present invention is that it operates in existing network infrastructures. Thus existing components in the LAN and the aggregation network need not be modified or upgraded. Also, the present invention will work independently of the presence of end-user firewalls and similar home network protections schemes designed to prevent ARP-based attacks from other end-users.

The invention claimed is:

1. A telecommunication network infrastructure comprising:
   two or more network nodes configured to operate as one virtual network node having a logical and a hardware virtual node address, the two or more network nodes configured to transmit a first information message comprising a logical address of the virtual network node;
   an access node adapted for receiving the first information message and for determining a hardware address associated with the logical address of the virtual network node;
   a bridging node adapted for connecting one or more end-user hosts with each other and with the access node; and
   one or more end-user hosts comprising a logical address adapted for communication with the virtual network node via the bridging node and the virtual access node,
   the access node being further configured for transmitting a second information message comprising the logical and hardware address of the virtual network node, wherein the bridging node is adapted to forward the second information message to one or more end-user hosts and to store the logical and hardware address of the virtual network node.

2. The telecommunication network according to claim 1, wherein the access node comprises a memory for storing associations between logical or hardware addresses of the virtual network node and the logical addresses of the end-user hosts.

3. The telecommunication network according to claim 2, wherein the access node is adapted for monitoring data traffic between an address allocation server and the one or more end-user hosts to determine the associations between the logical or hardware addresses of the virtual network and the logical addresses of the end-user hosts.

4. The telecommunication network according to claim 2, the access node having preconfigured associations between the logical or hardware address of the virtual network and the logical addresses of the end-user hosts.

5. The telecommunication network according to claim 2, the access node storing associations between the logical or hardware addresses of the virtual network node and the logical addresses of the end-user hosts belonging to a common logical channel.

6. The telecommunication network according to claim 1, wherein the access node is adapted for extracting the hardware address of the virtual network node from the first information message.

7. The telecommunication network according to claim 1, the access node determining the hardware address of the virtual network node by transmitting a third information message to the logical address of the virtual network node and receive the hardware address of the virtual network node as a response.

8. The telecommunication network according to claim 7, the access node transmitting the third information message to the logical address of the virtual network node after a trigger parameter, indicative of the number of first information messages received, has reached a predefined value.

9. The telecommunication network according to claim 7, wherein the third information message comprises an ARP message.

10. The telecommunication network according to claim 1, wherein the two or more network nodes have their own individual logical and hardware network addresses.

11. The telecommunication network according to claim 1, wherein the first information message comprises a VRRP (Virtual Router Redundancy Protocol) announcement message.

12. The telecommunication network according to claim 1, wherein the second information message comprises a gratuitous ARP (Address Resolution Protocol) message.

13. The telecommunication network according to claim 1, wherein the logical address comprises an IPv4 or IPv6 address and the hardware address comprises one of Ethernet MAC (Media Access Control) address or ATM MAC address.

14. The telecommunication network according to claim 1, wherein the two or more network nodes comprise VRRP (Virtual Router Redundancy Protocol) routers, while the virtual network node comprises a virtual router.

15. The telecommunication network according to claim 1, wherein the access node comprises an Ethernet switch or a DSLAM (Digital Subscriber Line Access Mutliplexer).

16. The telecommunication network according to claim 1, wherein each of the one or more end-user hosts comprises a mobile terminal or a static telecommunication terminal.

* * * * *